United States Patent
Mauerberger et al.

(10) Patent No.: US 7,690,567 B2
(45) Date of Patent: Apr. 6, 2010

(54) SCANNING UNIT FOR SCANNING A MEASURING STANDARD

(75) Inventors: Herbert Mauerberger, Traunstein (DE); Sebastian Tondorf, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 1730 days.

(21) Appl. No.: 10/789,707

(22) Filed: Feb. 27, 2004

(65) Prior Publication Data

US 2004/0168333 A1 Sep. 2, 2004

(30) Foreign Application Priority Data

Feb. 27, 2003 (DE) .................. 103 09 679

(51) Int. Cl.
  *G06K 7/00* (2006.01)
  *G01B 11/14* (2006.01)
(52) U.S. Cl. .............. 235/440; 356/616; 356/617
(58) Field of Classification Search ............ 235/455, 235/462.01, 462.32, 457; 33/707, 706; 250/273, 250/231.13, 231.14; 356/616, 620
See application file for complete search history.

(56) References Cited

U.S. PATENT DOCUMENTS

| | | | | |
|---|---|---|---|---|
| 4,363,964 A | * | 12/1982 | Schmitt | 250/237 G |
| 6,175,109 B1 | * | 1/2001 | Setbacken et al. | 250/231.13 |
| 7,141,780 B2 | * | 11/2006 | Homer et al. | 250/231.13 |
| 2005/0060905 A1 | * | 3/2005 | Novak et al. | 33/706 |

OTHER PUBLICATIONS

Ernst, A., "Measuring Principles and Methods," "Digital Linear and Angular Metrology—Position Feedback for Machine Manufacture and the Electronics Industry" (Verlag Moderne Industrie 1998), pp. 9 to 38.

Ernst, A., "Messprinzipien und Messverfahren," "Digitale Laengen- und Winkelmesstechnik—Positionsmesssysteme fuer den Maschinenbau und die Elektronikindustrie" (Verlag Moderne Industrie 1998), pp. 9 to 39.

* cited by examiner

*Primary Examiner*—Kumiko C Koyama
*Assistant Examiner*—Sonji Johnson
(74) *Attorney, Agent, or Firm*—Kenyon & Kenyon LLP

(57) ABSTRACT

A scanning unit is for scanning a measuring standard having a coded track formed by a graduated scale, such as an incremental track, and a reference mark system, including a detector system for scanning the coded track and an additional detector system for scanning the reference mark system. The detector system, when scanning the associated coded track or reference mark system, receives scanning signals on a signal-sensitive surface, and the additional detector system includes at least two sensors, of which only one is used for scanning the reference mark system during operation of the scanning unit. Each of the two sensors is connected to one of the two inputs of a differential amplifier, and the sensor not used for scanning is deactivated in that its signal-sensitive surface is covered.

22 Claims, 3 Drawing Sheets

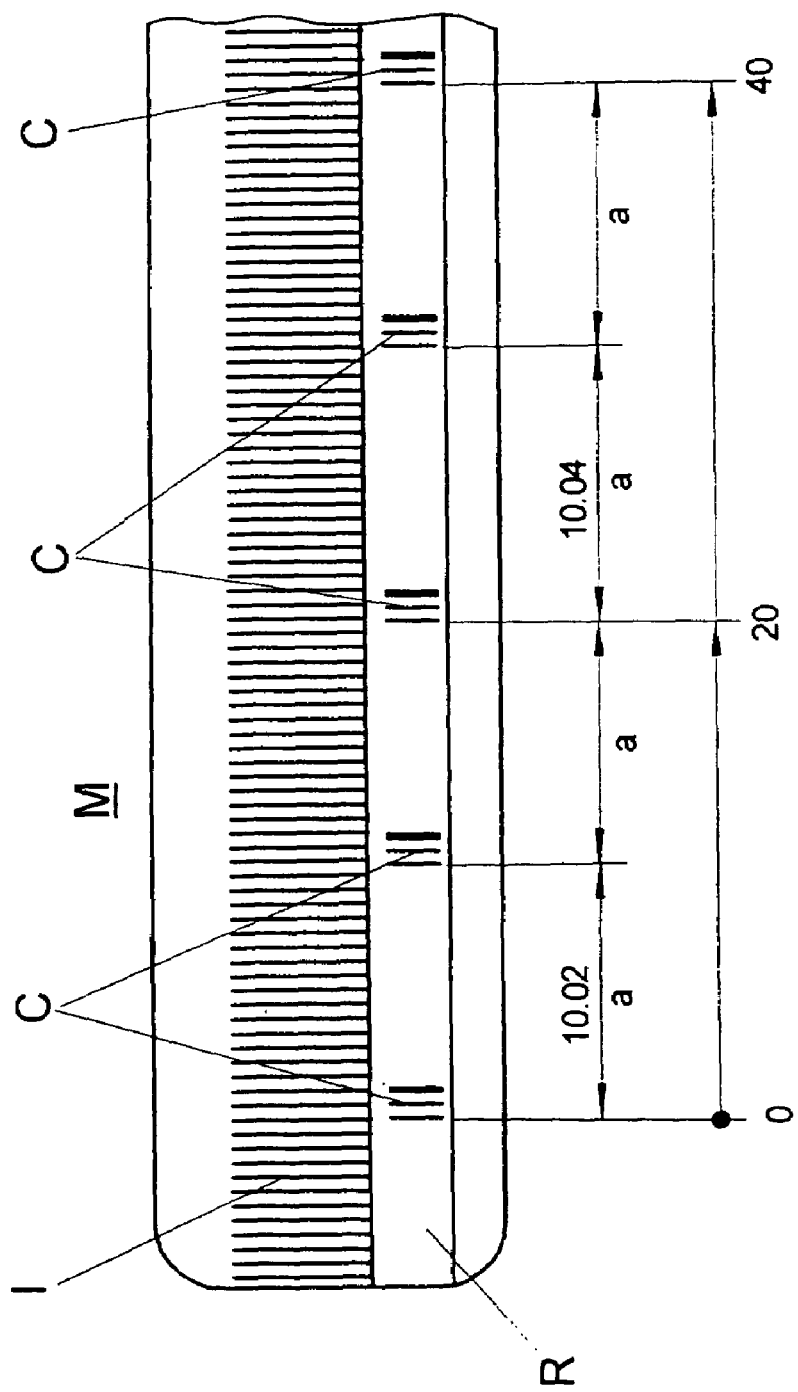

SCANNING UNIT FOR SCANNING A MEASURING STANDARD

CROSS-REFERENCE TO RELATED APPLICATIONS

The present application claims priority to Application No. 103 09 679.5, filed in the Federal Republic of Germany on Feb. 27, 2003, which is expressly incorporated herein in its entirety by reference thereto.

FIELD OF THE INVENTION

The present invention is directed to a scanning unit for scanning a measuring standard.

BACKGROUND INFORMATION

Scanning units are used for scanning a measuring standard, which, for example, may be implemented in the form of a scale having a coded or graduation track formed by a graduated scale, e.g., in the form of an incremental track, and, in addition to the coded track, a reference mark system. The scanning unit and the measuring standard are mounted, respectively, on one of two assemblies, which are movable relatively to one another and whose relative motion is to be measured. These may be, for example, a sliding carriage and the corresponding bed of a machine tool.

By scanning a coded track in the form of an incremental track composed of a periodic line graduation, the magnitude of the relative motion of the two assemblies with respect to one another can be ascertained. However, it is not possible to obtain any absolute positional information over great lengths. For that reason, to relate the relative motion of the two assemblies to a defined reference point, on one measuring standard, at least one reference mark is typically provided on which is used to identify a specific location on the measuring standard.

To scan a measuring standard of this kind, the scanning unit includes a first detector system or sensing array, for scanning the (incremental) coded track, as well as an additional detector system for scanning the reference track. In this context, however, the problem can arise, particularly when working with measuring standards constituted of a very long scale, that, during operation of the measuring device, it is, to a certain degree, not possible to bring the scanning unit into a position in relation to the associated measuring standard, where the scanning unit is able to sense the position of the reference mark of the measuring standard, for example, because of the danger of a collision with machine parts. For that reason, in the course of further development of a reference track constituted of one single reference mark, reference mark systems having coded reference marks have been developed. Reference mark systems of this kind have a multiplicity of reference marks arranged in series in the measuring direction (direction of extension of the incremental coded track) that are each uniquely differentiable from one another. Accordingly, each of these reference marks uniquely identifies a specific location on the measuring standard, so that multiple reference points are available as reference points for the position of the scanning unit in relation to the measuring standard. In this context, the reference marks can be coded in such a manner, for example, that they are disposed one behind the other or in series, spaced apart at different distances or spatial intervals. Then, in a process in which the scanning unit travels over two of the reference marks, a suitable algorithm is used to obtain the active (absolute) position of the scanning unit in relation to the measuring standard.

Conventional measuring devices have reference tracks including both simple as well as coded reference marks, the user being able to freely choose whether he/she will use the simple or the coded reference marks during operation of the measuring device. In this case, the detector system of the scanning unit assigned to the reference track has two sensors, one of which is assigned to the uncoded and the other to the coded reference marks. During operation of the measuring device, the one or the other sensor is optionally connected to an electrical amplifier which is supplied with the signals received by the sensor in question, as electric signals, during scanning of the measuring standard.

With regard to further details pertaining to the design of position-measuring systems or position encoders, which include a measuring standard and an associated scanning unit, reference is made to the textbook Digitale Laengen-und Winkelmesstechnik (Digital Linear and Angular Position Metrology) by Alfons Ernst, Publishers Moderne Indistrie (Modern Industry) (1998), pp. 9 through 38.

In the above-described measuring devices, the problem may arise that electrical interference, which acts, for example, on the sensor or on connecting lines between the sensor and the downstream electrical amplifier, can be misinterpreted as reference pulses by an evaluation unit (such as a machine control) downstream from the amplifier. This may lead to errors in the control of the machine tool in question and, in particular, may result in machine stoppage. To suppress interference, the amplifiers may be designed with lowpass filters. However, this noticeably retards the amplifiers and, thus, reduces the permissible traversing speed of the measuring device in question.

SUMMARY

As aspect of the present invention is to improve a scanning unit for scanning a measuring standard of a measuring device with respect to interference susceptibility when evaluating reference pulses.

According to an example embodiment of the present invention, two sensors are provided on the scanning unit. Each of the sensors is connected to one input of a differential amplifier. The sensor that is not used for scanning the measuring standard is deactivated with respect to scanning the measuring standard in that its signal-sensitive surface is covered (by a cover, for example, in the form of a diaphragm).

According to an example embodiment of the present invention, electrical interferences which act on the active sensor at the time (used for scanning the measuring standard) or on the downstream electrical lines are eliminated in the differential amplifier in that the corresponding interferences also occur at the second (deactivated sensor) or at its downstream electrical lines, and are suppressed in the differential amplifier by subtraction.

According to an example embodiment, the scanning unit may be configured, e.g., for scanning the measuring standard in accordance with the photoelectric measuring principle, so that the detector systems of the scanning unit are each made up of photoelements, e.g., in the form of photodiodes.

To enable the reference pulses to undergo a defined evaluation, regardless of which one of the two sensors provided for this purpose is used to scan the reference track, a first input of the differential amplifier is provided for the (active) sensor used for scanning the measuring standard, and the other input of the differential amplifier is provided for the deactivated, i.e., non-functioning sensor (covered on its radiation-sensitive surface). To this end, the two sensors may be linked to the two inputs of the differential amplifier such that the active sensor at the time is connected upstream from the first input, and the deactivated sensor at the time is connected upstream from the other input of the differential amplifier. The first input may be the inverting input of the differential amplifier.

According to an example embodiment, to ensure that the electrical interferences, which are to be compensated in the differential amplifier, have the same effect at both sensors, the two sensors are spatially positioned as closely together as possible. Moreover, the radiation-sensitive surfaces of the two sensors are made of the same material or at least of two very similar materials, with respect to their optical and electrical (opto-electronic) properties, and, to the greatest degree possible, correspond in size. Additionally, the electrical supply leads running from the particular sensor to the inputs of the differential amplifier are also designed to correspond to the greatest degree possible, so that interferences occurring in the supply leads may be compensated in the differential amplifier.

In accordance with an example embodiment of the present invention, the two sensors of the additional detector system are used for scanning the same reference marks (of one reference mark type) of the measuring standard. In this case, the second, deactivated sensor is provided solely for the purpose of being able to suppress interferences at the differential amplifier.

In accordance with an example embodiment of the present invention, the two sensors of the additional detector system are used for scanning different reference marks of the reference mark system, in particular, one of the sensors is adapted for scanning uncoded and the other sensor is adapted for scanning coded reference marks. For that matter, the two sensors are already present in order to be able to optionally scan the one or other type of reference marks. The two sensors which are already present then additional may assume the function of suppressing electrical interferences in that they are interconnected, for this purpose, to a differential amplifier.

In accordance with an example embodiment of the present invention, a scanning unit for scanning a measuring standard, which includes a coded track formed by a graduated scale and a reference mark system, includes a detector system configured to scan the coded track, an additional detector system configured to scan the reference mark system, the additional detector system including a signal-sensitive surface configured to receive scanning signals when scanning the reference mark system, the additional detector system including at least two sensors, the additional detector system configured to use only one of the at least two sensors to scan the reference mark system during operation of the scanning unit, a differential amplifier including two inputs, each of the sensors connected to a respective one of the two inputs, and an arrangement configured to cover the signal-sensitive surface of a sensor not used for scanning to deactivate the sensor not used for scanning.

The scanning unit may be configured to scan the measuring standard in accordance with a photoelectric measuring principle, and the two sensors may include photoelements, e.g., photodiodes.

A first input of the differential amplifier may be connected to the sensor used for scanning the measuring standard, a second input of the differential amplifier may be connected to the deactivated sensor.

Each sensor may be configured to be optionally activated with the other sensor deactivated, and each sensor configured to be optionally connected to each input of the differential amplifier. The sensors may be connected to the inputs of the differential amplifier so that the sensor used for scanning the measuring standard is connected to a first input of the differential amplifier and the other, deactivated sensor is connected to a second input of the differential amplifier. The sensor used for scanning the measuring standard may be connected to an inverting input of the differential amplifier.

The sensors may be positioned directly adjacent to one another. The signal-sensitive surfaces of the sensors may be made of the same material, and the signal-sensitive surfaces of the sensors may be substantially the same size.

Electrical connecting lines between the sensors and a corresponding input of the differential amplifier may be conforming, e.g., they have substantially a same length.

The sensors may be configured to scan reference marks of the reference mark system having exactly one type. The sensors may be configured to scan different reference marks of the reference mark system.

The reference mark system may include coded and uncoded reference marks. The reference marks system may include distance-coded reference marks and uncoded reference marks.

The coded track is arranged as an incremental track.

In accordance with an example embodiment of the present invention, a measuring device for taking positional measurements of two assemblies which are movable in relation to one another, includes a measuring standard including a coded track formed by a graduated scale and a reference mark system, and a scanning unit. The scanning unit may include a detector system configured to scan the coded track, an additional detector system configured to scan the reference mark system, the additional detector system including a signal-sensitive surface configured to receive scanning signals when scanning the reference mark system, the additional detector system including at least two sensors, the additional detector system configured to use only one of the at least two sensors to scan the reference mark system during operation of the scanning unit, a differential amplifier including two inputs, each of the sensors connected to a respective one of the two inputs, and an arrangement configured to cover the signal-sensitive surface of a sensor not used for scanning to deactivate the sensor not used for scanning.

BRIEF DESCRIPTION OF THE DRAWINGS

FIG. 1 shows an example scale for a linear measuring system having an incremental track and a reference track.

FIG. 3a shows an example circuit arrangement for the two photodiodes of the scanning unit of FIG. 2a.

DETAILED DESCRIPTION

FIG. 1 shows a scale M for a photoelectrical linear measuring system, which has a coded track in the form of an incremental graduation I, formed by a periodic line-graduation structure, as well as a reference track in the form of a plurality of distance-coded or spatial interval-coded reference marks C. The distance coding of the reference marks is achieved in that two reference marks C disposed sequentially in the measuring direction (i.e., the direction of extension of the incremental graduation I) are spaced apart by a unique distance a, which differs from all other distances between two reference marks C.

If the need arises, in addition to distance-coded reference marks C, other uncoded reference marks may also be provided on scale M, so that the coded or the uncoded reference marks may optionally be utilized to generate reference pulses (the reference track having different reference mark or graduation patterns).

Figure 2A:
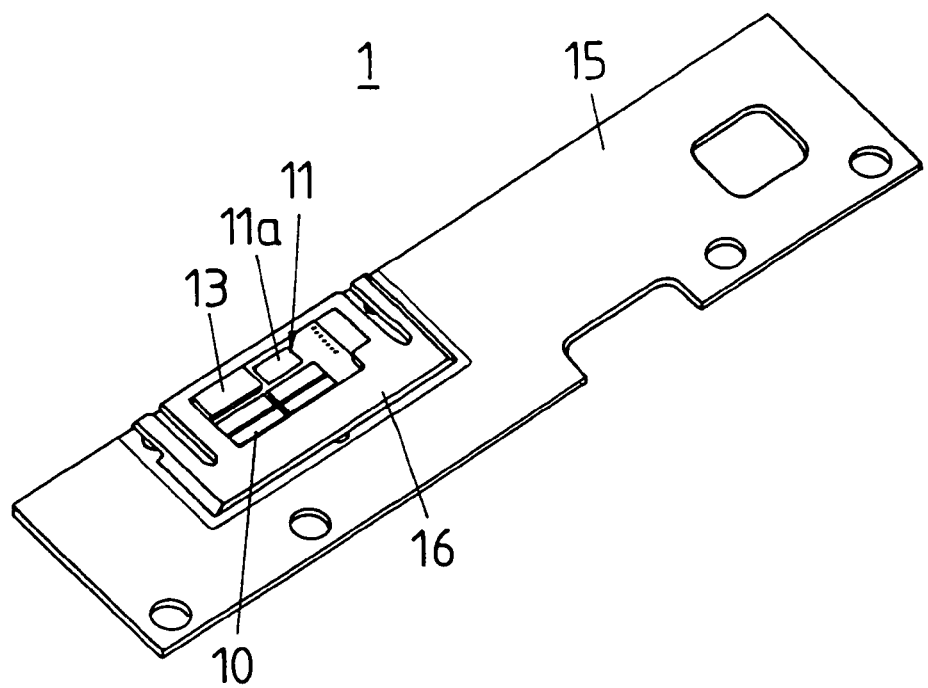
FIG. 2a shows a scanning unit for scanning the scale shown in FIG. 1 in accordance with the photoelectrical measuring principle, using to photodiodes for scanning the reference track, one of which is covered in the area of its radiation-sensitive circuit.

FIG. 2a shows an example scanning unit which is used to scan scale M illustrated in FIG. 1 in accordance with the photoelectrical measuring principle. In this scanning unit, a base element 15 in the form of a plate and surrounded by a protective frame 16, two detector systems 10 and 11, 12, respectively, are provided, which may be used to photoelectrically scan incremental track I and reference track R of the scale shown in FIG. 1.

Detector system 10 provided for scanning incremental track I is composed of a plurality of photodiodes, which scan the periodic line-graduation structure of incremental track I that is illuminated using, for example, a transmitted light, incident-light or reflected-light method and, in this manner, are able to sense a relative motion of scanning unit 1 with respect to scale M. In this manner, motions of scanning unit 1 in relation to scale M in the measuring direction (direction of extension of incremental graduation I) may be determined very precisely.

To be able to relate these relative motions to a reference point, the other detector system 11, 12 (compare FIG. 2b) is used to scan reference track R of scale M. The other detector system is composed of two photodiodes 11 and 12, which are positioned directly next to one another within protective frame 16 and whose radiation-sensitive surfaces 11a, 12a are made of the same material and have the same surface.

To scan reference track R of scale M of FIG. 1, optionally the one or other photodiode 11, 12 may be used. The photodiode not used for scanning in the particular case is covered by a diaphragm 13, which may be integrated in protective frame 15 and be displaceably positioned thereon, so that it may optionally be guided in front of radiation-sensitive surface 11a of the one photodiode 11 (FIG. 2b) or radiation-sensitive surface 12a of the other photodiode 12 (FIG. 2a). Alternatively, a diaphragm 13 may optionally be slid onto the photodiode not used for scanning in the particular case, it being possible, e.g., for two separate diaphragms 13 to be provided, which are each assigned to one of the two photodiodes 11, 12 and of which one is slid in each instance onto assigned photodiode 11 or 12 (not used for scanning).

If reference track R of scale M, as shown in FIG. 1, is made of only distance-coded reference marks C, photodiode 11 or 12 activated at the time (not covered) may always be used for scanning these coded reference marks C. In this case, it is not necessary to move diaphragm 13 optionally in front of radiation-sensitive surface 11a, 12a of the one or other photodiode 11, 12. Here, one of the two photodiodes 11, 12 may also be permanently covered by diaphragm 13, so that the other one of the two photodiodes 11, 12 may always be used for scanning reference track R.

Figure 2B:
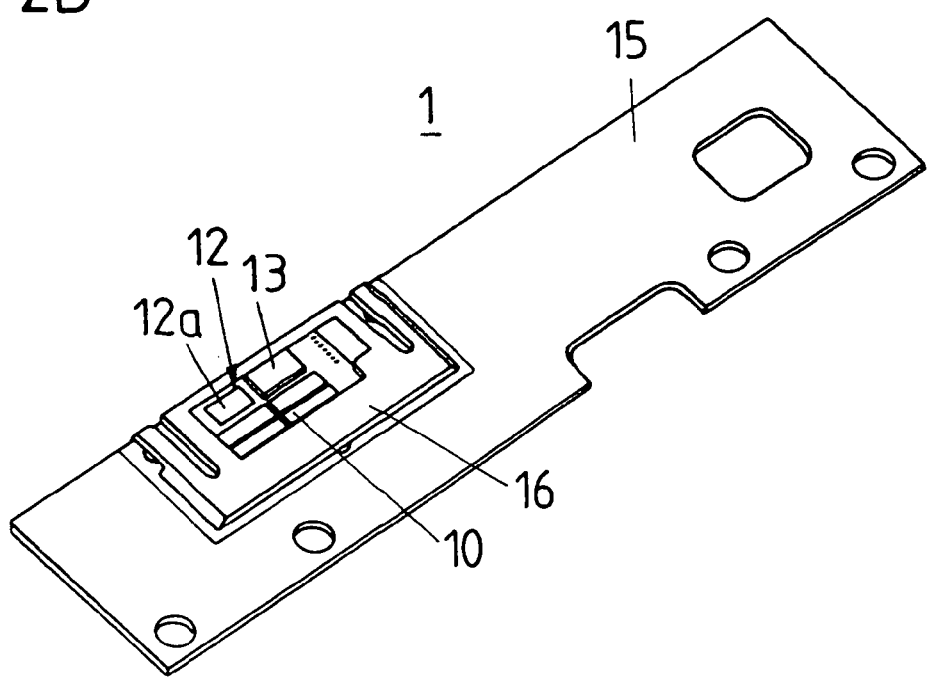
FIG. 2b shows the scanning unit of FIG. 2a, the other of the two photodiodes being covered in the area of its radiation-sensitive surface.

In the case that reference track R, besides coded reference marks C shown in FIG. 1, additionally has at least one uncoded reference mark, then the one photodiode 11 is assigned to the coded reference marks and the other photodiode 12 to the uncoded reference marks. In this case, the one photodiode or the other photodiode is optionally covered with one diaphragm 13, as illustrated in FIGS. 2a and 2b, that photodiode 11 or 12 always having an uncovered radiation-sensitive surface 11a or 12a which is required to be active for scanning the assigned reference marks. Thus, depending on whether the one or other type of reference marks of the reference track is to be scanned, one of the two photodiodes 11, 12 is covered with an assigned diaphragm 13.

The term "reference track" should not be understood to mean that the reference marks of the one and other type (coded and uncoded reference marks) necessarily have to be arranged one behind the other in the measuring direction (direction of extension of incremental track I). Rather, the additional, uncoded reference marks may be arranged at any location on the scale, e.g., also transversely to the direction of extension of incremental track I, next to coded reference marks C. Accordingly, the term "reference track" includes all reference marks of the graduated scale, regardless of how they are arranged on the scale.

Figure 3A:
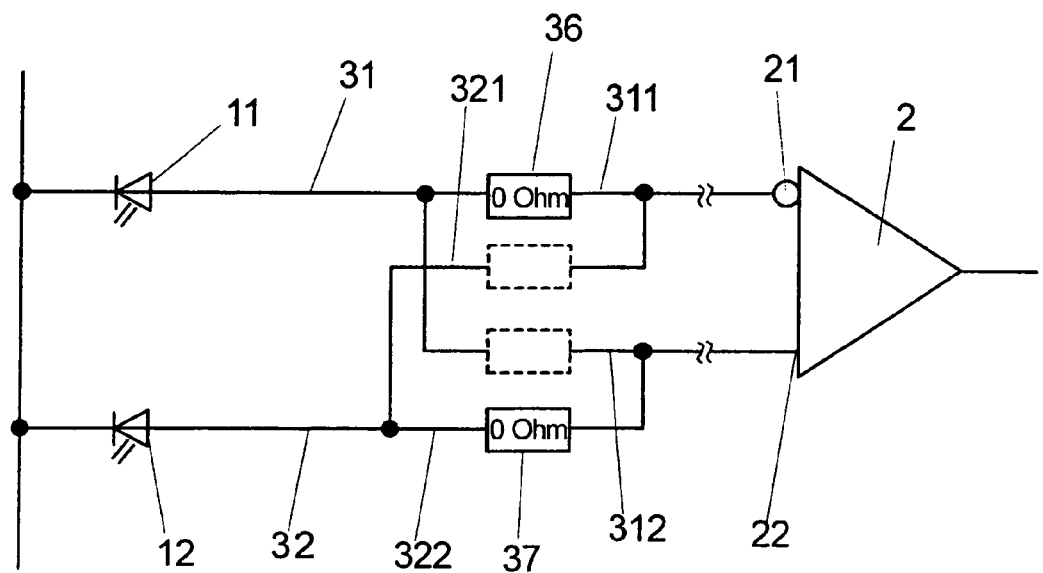
Figure 3B:
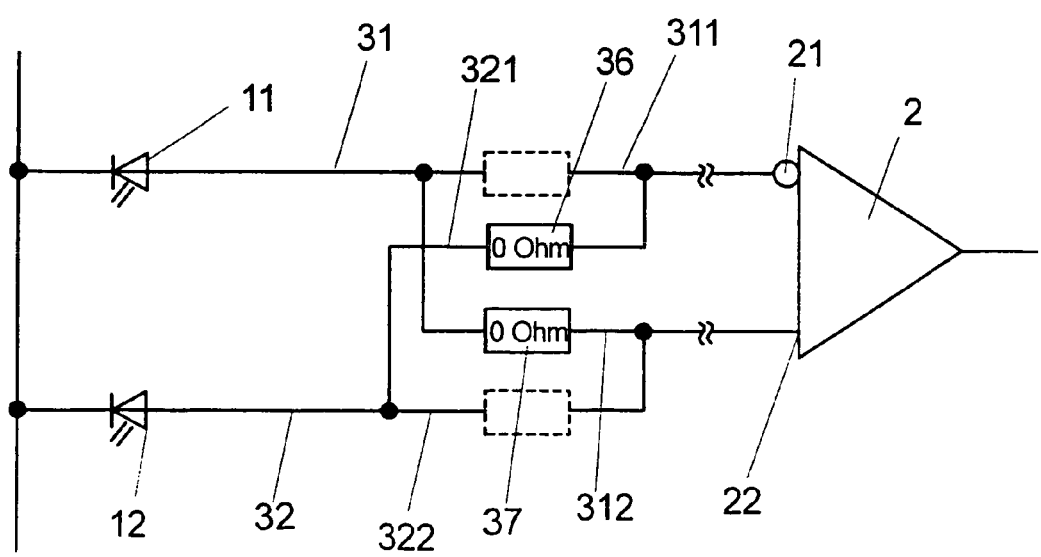
FIG. 3b shows an example circuit arrangement for the photodiodes of the scanning unit of FIG. 2b.

Regardless of which of the two photodiodes 11, 12 is used for scanning reference track R and which of the two photodiodes 12, 12 is deactivated by the covering of its radiation-sensitive surface 11a or 12a by diaphragm 13, both photodiodes 11, 12 may always be connected to the inputs of a differential amplifier 2, as shown in FIGS. 3a and 3b. FIG. 3a shows an example interconnection configuration of the two photodiodes 11, 12 in the case where first photodiode 11 is active and second photodiode 12 is covered and is thus non-functioning with regard to the scanning. FIG. 3b shows a reverse case in which first photodiode 11 is covered and is thus non-functioning with regard to the scanning, and second photodiode 12 is active.

As is made clear by FIGS. 3a and 3b, the two photodiodes 11, 12 are each connected via one electrical line 31 and 32, respectively, to the two inputs 21, 22 of differential amplifier 2. To this end, the two electrical lines 31, 32 branch off in such a manner that each of the two photodiodes 11, 12 is connected via the one branch 311 and 321, respectively, of the associated electrical line 31, 32 to the one input 21 and via the other branch 312 or 322 of the particular electrical line 31 and 32, respectively, to the second input 22 of the differential amplifier. Here, the four branches 311, 312, 321, 322 of the two electrical lines 31, 32 each have one line disconnection or open circuit, so that the corresponding branch of the particular electrical line only establishes a connection with the corresponding input of differential amplifier 2, when this line disconnection has been bridged by a suitable electrical component, represented here by a 0-ohmic resistor 36 or 37 (by solder bridges 36, 37 represented by 0-ohmic resistors).

In the state illustrated in FIG. 3a, which corresponds to the configuration shown in FIG. 2a, the first active photodiode 11 is connected via first branch 311 of its output-side electrical line 31 to inverting input 21 of differential amplifier 2. Conversely, the deactivated, diaphragmed second diode 12 is connected on the output side via second branch 322 of its output-side electrical line 32 to the second, non-inverting input 22 of differential amplifier 2.

In the state shown in FIG. 3b, which corresponds to the configuration shown in FIG. 2b, conversely, the first, in this case diaphragmed and thus non-functioning photodiode 11 is connected via corresponding branch 312 of its output-side electrical line 31 to the second non-inverting input 22 of differential amplifier 2; and the second, in this case active photodiode 12 is connected via the corresponding branch 321 of its output-side electrical connecting line 32 to the first inverting input 21 of differential amplifier 2.

As a result, the active photodiode at the time, used for scanning reference track R, is connected to the inverting input and the other photodiode to the non-inverting input of the differential amplifier. In this context, the two supply leads 31, 32 are identical in design and have the same length between the particular photodiode 11, 12 and the particular input 21, 22 of differential amplifier 2, regardless of which of the two branches 311, 312 and 321, 322, respectively, of the particular electrical connecting line 31, 32 is equipped with an element 36, 37 for bridging the line disconnection.

As a result, in the scanning unit shown in FIGS. 2a and 2b and the corresponding circuit arrangement shown in FIG. 3a and 3b, respectively (for connecting each of photodiodes 11, 12 to one input of a differential amplifier 2), electrical interferences occurring at photodiodes 11, 12 and connecting lines 31, 32 are suppressed by subtraction in amplifier 2, namely by forming the difference between the current signals generated by the two photodiodes 11, 12. Because of the conforming design, both of the two photodiodes, 11, 12, as well as of the corresponding electrical connecting lines 31, 32, and of the spatial arrangement of these electrical modules in immediate vicinity, this suppression of electrical interferences is effective independently of whether the corresponding interferences occur at photodiodes 11, 12 or in electrical connecting lines 31, 32 between photodiodes 11, 12 and inputs 21, 22 of differential amplifier 2 (clock input and push-pull input of amplifier 2).

This prevents electrical interferences acting on photodiodes 11, 12 or on electrical lines 31, 32 and amplified in amplifier 2 from being misinterpreted as reference pulses by the evaluation unit (machine control) connected in outgoing circuit to amplifier 2. On the basis of the system described with reference to FIGS. 1 through 3b, by the diaphragmed, deactivated sensor and the electrical line connected in an outgoing circuit in each instance, a push-pull or differential mode in-coupling and push-pull transmission is achieved for occurring electrical interferences, the electrical signal paths for clock and push-pull conforming due to the conforming design of the two photodiodes 11, 12 and of connecting lines 31, 32, so that electrical interferences have an equal effect at both signal paths and are able to be largely suppressed in differential amplifier 2.

What is claimed is:

1. A scanning unit for scanning a measuring standard including a coded track formed by a graduated scale and a reference mark system, comprising:
   a detector system configured to scan the coded track;
   an additional detector system configured to scan the reference mark system, the additional detector system including a signal-sensitive surface configured to receive scanning signals when scanning the reference mark system, the additional detector system including at least two sensors, each of the at least two sensors of the additional detector system positioned to scan the reference mark system, the additional detector system configured to use only one of the at least two sensors to scan the reference mark system during operation of the scanning unit;
   a differential amplifier including two inputs, each of the sensors connected to a respective one of the two inputs; and
   an arrangement configured to cover the signal-sensitive surface of a sensor of the at least two sensors of the additional detector system not used for scanning to deactivate the sensor not used for scanning.

2. The scanning unit as recited in claim 1, wherein the scanning unit is configured to scan the measuring standard in accordance with a photoelectric measuring principle, and wherein the two sensors include photoelements.

3. The scanning unit as recited in claim 2, wherein the photoelements include photodiodes.

4. The scanning unit as recited in claim 1, wherein a first input of the differential amplifier is connected to the sensor used for scanning the measuring standard and a second input of the differential amplifier is connected to the deactivated sensor.

5. The scanning unit as recited in claim 1, wherein each sensor is configured to be optionally activated with the other sensor deactivated, each sensor configured to be optionally connected to each input of the differential amplifier.

6. The scanning unit as recited in claim 5, wherein the sensors are connected to the inputs of the differential amplifier so that the sensor used for scanning the measuring standard is connected to a first input of the differential amplifier and the other, deactivated sensor is connected to a second input of the differential amplifier.

7. The scanning unit as recited in claim 6, wherein the sensor used for scanning the measuring standard is connected to an inverting input of the differential amplifier.

8. The scanning unit as recited in claim 1, wherein the sensors are positioned directly adjacent to one another.

9. The scanning unit as recited in claim 1, wherein the signal-sensitive surfaces of the sensors are made of the same material.

10. The scanning unit as recited in claim 1, wherein the signal-sensitive surfaces of the sensors are substantially the same size.

11. The scanning unit as recited in claim 1, wherein electrical connecting lines between the sensors and a corresponding input of the differential amplifier are conforming.

12. The scanning unit as recited in claim 1, wherein electrical connecting lines between the sensors and a corresponding input of the differential amplifier have substantially a same length.

13. The scanning unit as recited in claim 1, wherein the sensors are configured to scan reference marks of the reference mark system having exactly one type.

14. The scanning unit as recited in claim 1, wherein the sensors are configured to scan different reference marks of the reference mark system.

15. The scanning unit as recited in claim 14, wherein the reference mark system includes coded and uncoded reference marks.

16. The scanning unit as recited in claim 14, wherein the reference marks system includes distance-coded reference marks and uncoded reference marks.

17. The scanning unit as recited in claim 1, wherein the coded track is arranged as an incremental track.

18. A scanning unit for scanning a measuring standard including a coded track formed by a graduated scale and a reference mark system, comprising:
   a detector system configured to scan the coded track;
   an additional detector system configured to scan the reference mark system, the additional detector system including a signal-sensitive surface configured to receive scanning signals when scanning the reference mark system, the additional detector system including at least two sensors, each of the at least two sensors of the additional detector system positioned to scan the reference mark system, the additional detector system configured to use only one of the at least two sensors to scan the reference mark system during operation of the scanning unit;
   a differential amplifier including two inputs, each of the sensors connected to a respective one of the two inputs; and
   an arrangement configured to cover the signal-sensitive surface of a sensor of the at least two sensors of the additional detector system not used for scanning to deactivate the sensor not used for scanning;

wherein the arrangement configured to cover the signal-sensitive surface of the sensor of the at least two sensors of the additional detector system not used for scanning to deactivate the sensor not used for scanning permanently covers the signal-sensitive surface of the sensor of the at least two sensors of the additional detector system not used for scanning.

19. The scanning unit as recited in claim 1, wherein the differential amplifier is configured to suppress electrical interference occurring at the sensors or connecting lines that connect the sensors to the respective inputs of the differential amplifier by subtraction of signals received by the differential amplifier from the sensors.

20. A measuring device for taking positional measurements of two assemblies which are movable in relation to one another, comprising:

a measuring standard including a coded track formed by a graduated scale and a reference mark system; and a scanning unit, including:

a detector system configured to scan the coded track;

an additional detector system configured to scan the reference mark system, the additional detector system including a signal-sensitive surface configured to receive scanning signals when scanning the reference mark system, the additional detector system including at least two sensors, each of the at least two sensors of the additional detector system positioned to scan the reference mark system, the additional detector system configured to use only one of the at least two sensors to scan the reference mark system during operation of the scanning unit;

a differential amplifier including two inputs, each of the sensors connected to a respective one of the two inputs; and an arrangement configured to cover the signal-sensitive surface of a sensor of the at least two sensors of the additional detector system not used for scanning to deactivate the sensor not used for scanning.

21. A measuring device for taking positional measurements of two assemblies which are movable in relation to one another, comprising:

a measuring standard including a coded track formed by a graduated scale and a reference mark system; and a scanning unit, including:

a detector system configured to scan the coded track;

an additional detector system configured to scan the reference mark system, the additional detector system including a signal-sensitive surface configured to receive scanning signals when scanning the reference mark system, the additional detector system including at least two sensors, each of the at least two sensors of the additional detector system positioned to scan the reference mark system, the additional detector system configured to use only one of the at least two sensors to scan the reference mark system during operation of the scanning unit;

a differential amplifier including two inputs, each of the sensors connected to a respective one of the two in inputs; and an arrangement configured to cover the signal-sensitive surface of a sensor of the at least two sensors of the additional detector system not used for scanning to deactivate the sensor not used for scanning;

wherein the arrangement configured to cover the signal-sensitive surface of the sensor of the at least two sensors of the additional detector system not used for scanning to deactivate the sensor not used for scanning permanently covers the signal-sensitive surface of the sensor of the at least two sensors of the additional detector system not used for scanning.

22. The measuring device as recited in claim 20, wherein the differential amplifier is configured to suppress electrical interference occurring at the sensors or connecting lines that connect the sensors to the respective inputs of the differential amplifier by subtraction of signals received by the differential amplifier from the sensors.

* * * * *